US006931715B2

(12) United States Patent
Lawrence

(10) Patent No.: US 6,931,715 B2
(45) Date of Patent: Aug. 23, 2005

(54) PIPE ASSEMBLY TABLE

(76) Inventor: Richard Lawrence, 31441 Holly St. NW., Cambridge, MN (US) 55008

( * ) Notice: Subject to any disclaimer, the term of this patent is extended or adjusted under 35 U.S.C. 154(b) by 256 days.

(21) Appl. No.: 10/299,402

(22) Filed: Nov. 19, 2002

(65) Prior Publication Data

US 2004/0093709 A1 May 20, 2004

(51) Int. Cl.[7] .................... B23Q 15/00; B25B 1/20
(52) U.S. Cl. .................... 29/721; 29/281.5; 269/45
(58) Field of Search .................... 29/281.1, 281.5, 29/282, 721; 269/45, 50, 60, 81

(56) References Cited

U.S. PATENT DOCUMENTS 2,774,134 A * 12/1956 Smith et al. .......... 269/45
2,817,892 A * 12/1957 Jones .......... 269/45
3,086,767 A * 4/1963 Boser .......... 269/45
3,772,753 A * 11/1973 Sargeant .......... 29/721
3,870,288 A * 3/1975 McLarnon .......... 269/45
5,040,716 A * 8/1991 Stetz .......... 228/49.3
5,396,786 A 3/1995 Bartholomew et al. .......... 72/57
5,839,181 A * 11/1998 Chu .......... 29/281.5
5,890,341 A 4/1999 Bridges et al. .......... 52/745.2
6,367,788 B1 * 4/2002 Babchuk .......... 269/45
6,634,631 B2 * 10/2003 Hebert .......... 269/45
2001/0045230 A1 11/2001 Olson et al. .......... 137/363

* cited by examiner

*Primary Examiner*—David P. Bryant
(74) *Attorney, Agent, or Firm*—Sherrill Law Offices, PLLC; Elizabeth Lewen

(57) ABSTRACT

A device to facilitate assembly of plumbing pipes and fittings comprising a frame, a plurality of laterally extending crossbars, and at least one transversely extending pipe jig. The frame has at least a longitudinally elongated rail. The plurality of laterally extending crossbars repositionally attaches to the rail and may be longitudinally repositioned along the rail. Each pipe jig has a post and a seat. The seat is attached proximate the distal end of the post. The pipe jig is attached to a selected crossbar.

18 Claims, 14 Drawing Sheets

PIPE ASSEMBLY TABLE

FIELD OF INVENTION

This invention relates to a device for assembling plumbing pipes and fittings.

BACKGROUND

Construction projects are often under tight time schedules and money constraints. This often means that the job sites are fast paced, hectic, and crowded. The situation is often exacerbated when problems occur delaying the schedule such as delayed materials, worker injuries, or inclement weather. All these condition often make it difficult to find the room to store materials, assemble materials, or even complete tasks on time.

A single construction site requires laborers and professionals from many different construction related areas, such as civil engineers, mechanical engineers, bricklayers, plumbers, electricians, architects, and many other people. Each group of people has different objectives for the construction project and different time schedules. Often one group's work can not be started until another group's is completed or started. This inter-group dependency can stem from the need to remove stored materials of one group from an area needed to be worked in by another group to a task of one group needing completion before another group's task can commence. For example, the plumbers must install the waste and vent piping in the floors and walls of a structure prior to the drywallers or floor installers installing drywall and flooring material. A delay by the plumbers can cause the drywallers and floor installers to be delayed in starting and completing their tasks. The plumbers can often be delayed due to lack of available space to store the materials they need to complete their jobs, congestion in the job site due to the abundance of individual tasks taking place all at once, or even inability to begin work due to weather conditions at the job site.

Therefore, a need exists for a system that allows a construction group, such as plumbers; to reduce the amount of time and stored materials needed at a job site to complete the group's assigned tasks.

SUMMARY OF INVENTION

A first embodiment of the invention is a device to facilitate assembly of plumbing pipes and fittings comprising a frame, a plurality of laterally extending crossbars, and at least one transversely extending pipe jig. The frame has at least a longitudinally elongated rail. The plurality of laterally extending crossbars repositionally attaches to the rail and may be longitudinally repositioned along the rail. Each pipe jig has a post and a seat. The seat is attached proximate the distal end of the post. The pipe jig is attached to a selected crossbar.

A second embodiment of the invention is a device to facilitate assembly of plumbing pipes and fittings comprising a frame, a plurality of laterally extending crossbars, and at least one transversely extending fitting jig. The frame has at least a longitudinally elongated rail. The plurality of laterally extending crossbars repositionally attaches to the rail and may be longitudinally repositioned along the rail. Each fitting jig has a post and an interface member. The interface member is attached proximate the distal end of the post. The fitting jig is repositionally attached to a selected crossbar whereby the interface member may be transversely repositioned relative to the selected crossbar.

A third embodiment of the invention is a device to facilitate assembly of plumbing pipes and fittings comprising a frame, a plurality of laterally extending crossbars, and at least one transversely extending pipe jig. The frame has at least a longitudinally elongated rail. The plurality of laterally extending crossbars repositionally attaches to the rail and may be longitudinally repositioned along the rail. Each pipe jig has a post and a pivotable seat. The pivotable seat is repositionably attached proximate the distal end of the post. The pipe jig is attached to a selected crossbar and the pivotable seat may be transversely repositioned relative to the post along an elongated length of the post.

DETAILED DESCRIPTION OF THE INVENTION INCLUDING A BEST MODE

Nomenclature

10 Device
20 Frame
21 Rail
**21*a*** Length of Rail
22 Track
23 Leg
30 Crossbar
31 Length of Crossbar
32 Runner
33 Bore of Crossbar
**33*a*** Axis of Bore
34 Slot
40 Pipe Jig
41 Post of Pipe Jig
**41*a*** Distal End of Post

41*b* Proximal End of Post
42 Seat of Pipe Jig
50 Fitting Jig
51 Post of Fitting Jig
51*a* Distal End of Post
51*b* Proximal End of Post
52 Interface Member of Fitting Jig
60 End Jig
61 Post of End Jig
62 Connection Member of End Jig
62*a* Bore
62*b* Axis of Connection Member
63 Bushing
64 Angle Adjuster
64*a* Bore of Angle Adjuster
65 Tightening Mechanism
70 Laser Level Assembly
71 Post of Laser Level Assembly
72 Platform of Laser Level Assembly
72*a* Distal End of Platform
73 Level of Laser Level Assembly
100 Pipe
200 Pipefitting
x Longitudinal
y Lateral
z Transverse Construction The device 10 can be used to pre-assemble pipe 100, such as vent and waste pipe 100, with pipefittings 200 for later installation of the unit (not shown) at a construction site. The device 10 can be used at the construction site or at an off-site location. Waste pipe 100 is one of the most common types of piping 100 used on construction sites. Therefore, the remainder of the discussion will be based upon a device 10 for assembling waste pipe 100.

Figure 1:
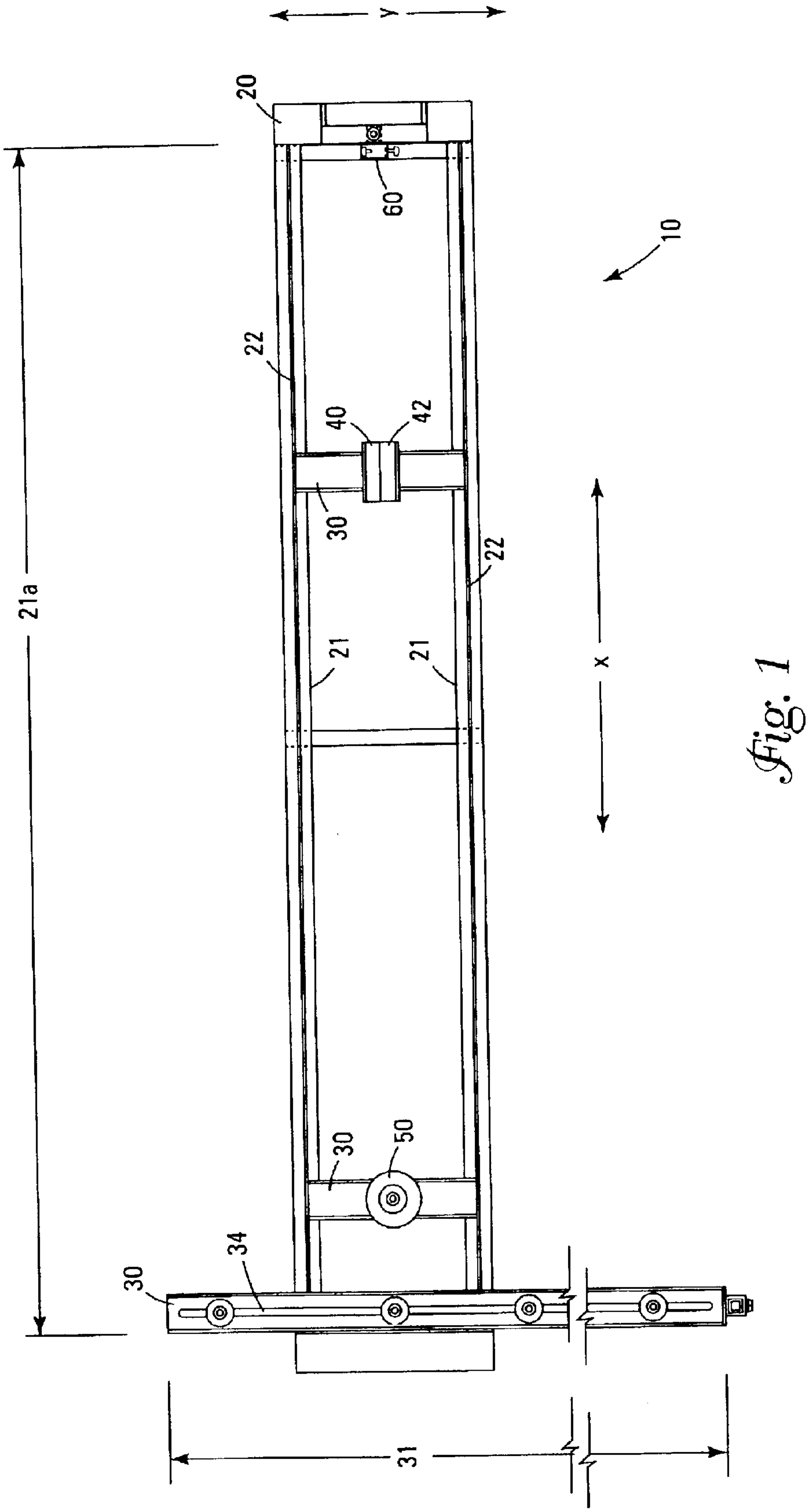
FIG. 1 is a top view of one embodiment of the device.
Figure 2:
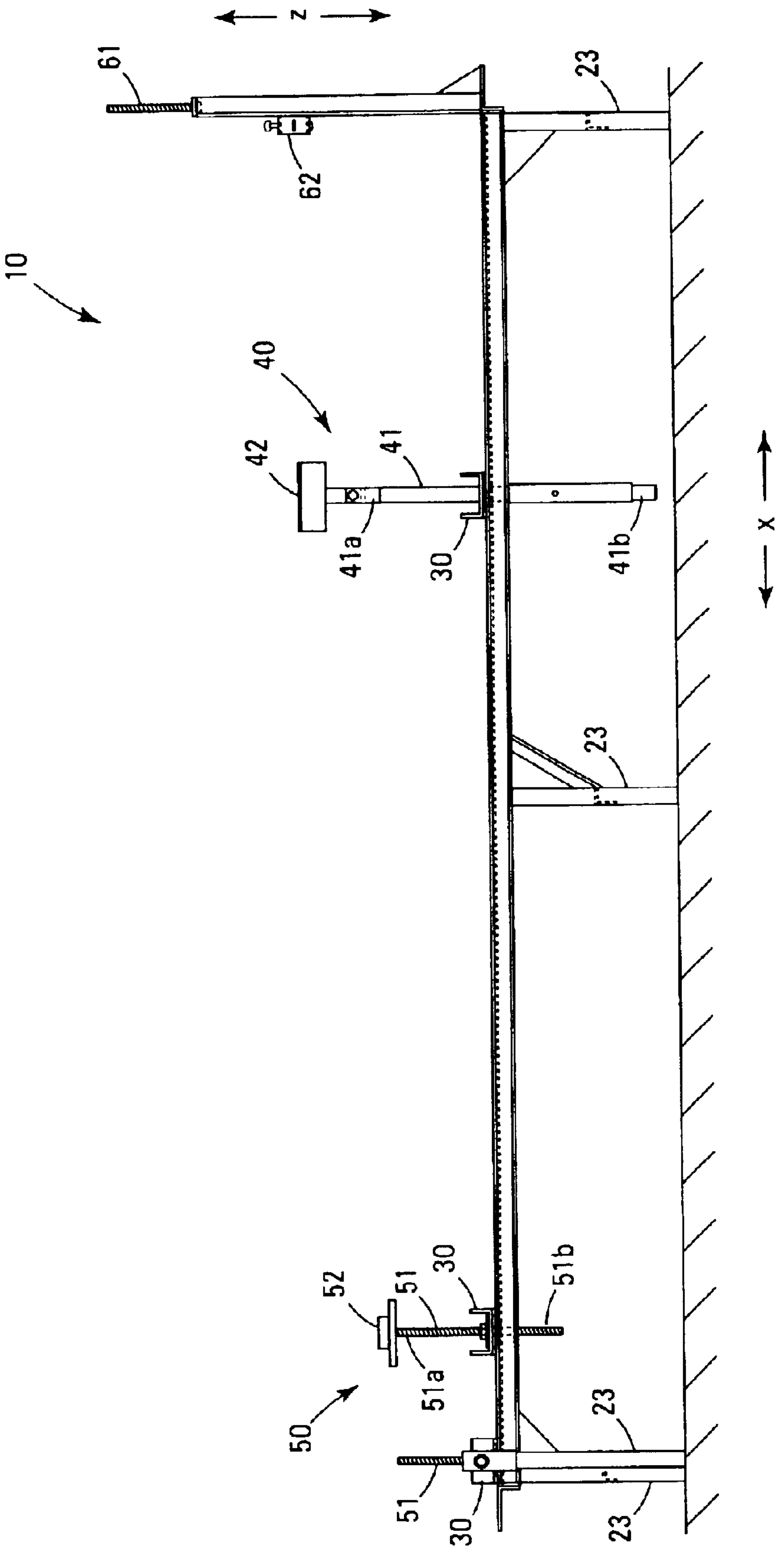
FIG. 2 is side view of the device in FIG. 1.

As shown in FIGS. 1 and 2, one embodiment of the device 10 comprises a frame 20, a plurality of laterally y extending crossbars 30, and at least one transversely z extending pipe jig 40. The frame 20 may be made from any number of suitable materials including wood, iron, steel, or plastic. Preferably the frame 20 is made from iron.

The frame 20 has at least a longitudinally x elongated rail 21. As shown in FIG. 1, the preferred embodiment of the frame 20 has two longitudinally x elongated rails 21 laterally y spaced from one another. The dimensions of the rail 21 will depend upon the type, amount, and size of pipe 100 to be assembled. Preferably the rails 21 are made from 1.5-inch×1.5-inch×0.1875-inch angle iron mounted to 3.0-inch×0.1875-inch channel iron. This embodiment of the rail 21 provides a longitudinal x track 22 in the rail 21 running the length 21*a* of the rail 21.

As shown in FIG. 2, the frame 20 may also have legs 23 to support the frame 20. The legs 23 may have a fixed height or be adjustable. Preferably the legs 23 are adjustable to allow the device 10 to be comfortably used by any number of people or under varying conditions. Having the legs 23 independently adjustable allows the device 10 to be leveled when used upon an uneven surface.

Figure 3:
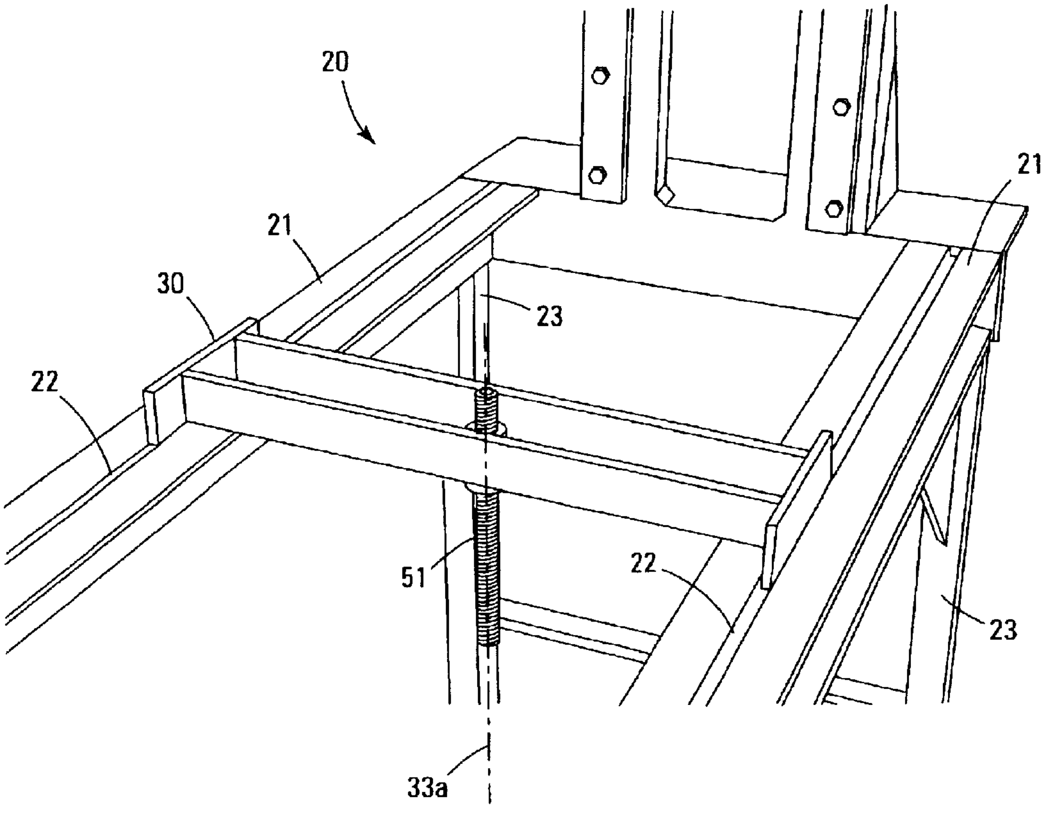
FIG. 3 is partial perspective view of one longitudinal end of one embodiment of the device with a cross bar.

FIG. 3 shows one embodiment of the plurality of laterally y extending crossbars 30. The crossbars 30 may be made from any number of suitable materials including wood, iron, steel, or plastic. Preferably the crossbars 30 are made from iron. The crossbars 30 are made to be repositionally attached to the rail 21 whereby the crossbars 30 may be longitudinally x repositioned along the rail 21. Preferably the crossbars 30 have one or more runners 32 attached to the underside (not numbered) of the crossbar 30. A runner 32 may then be inserted into the track 22 of a rail 21 to facilitate longitudinal x repositioning of the crossbar 30 along the length 21*a* of the rail 21.

Figure 4:
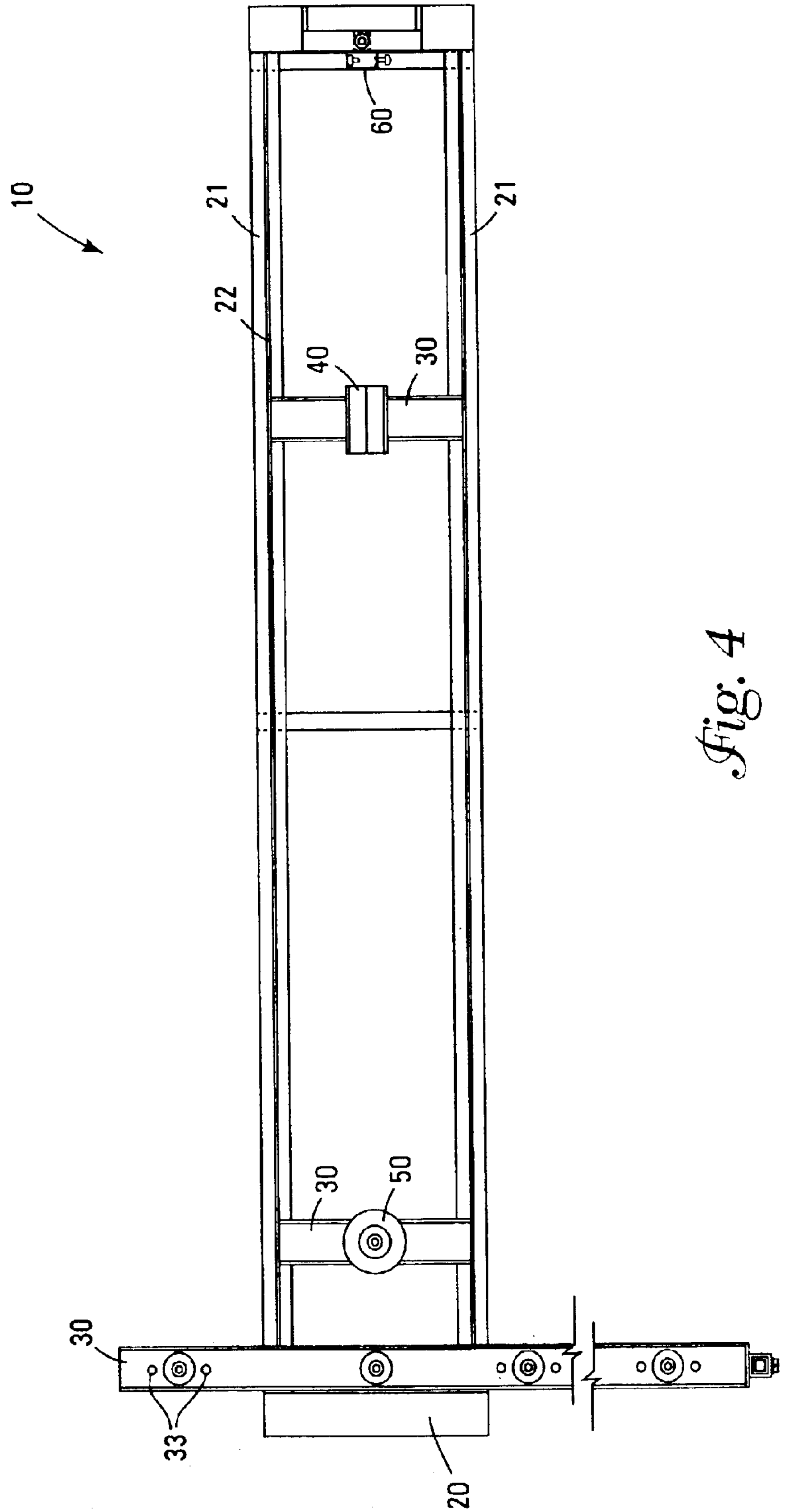
FIG. 4 is a top view of one embodiment of the invention with a crossbar with multiple bores.

The plurality of laterally y extending crossbars 30 can have any lateral y length 31 that is needed. FIG. 3 shows one embodiment of the crossbar 30. In FIG. 3, the crossbar's 30 lateral y length 31 is the same as the lateral y distance (not numbered) between the tracks 22 in the two longitudinally x elongated rails 21. The crossbar 30 may also extend laterally y beyond a rail 21 as shown in FIGS. 1 and 4. To provide stability and strength to a crossbar 30 that has a lateral y length 31 extending beyond the rail 21, a leg 23 may be affixed to the underside (not numbered) of the crossbar 30.

Figure 6:
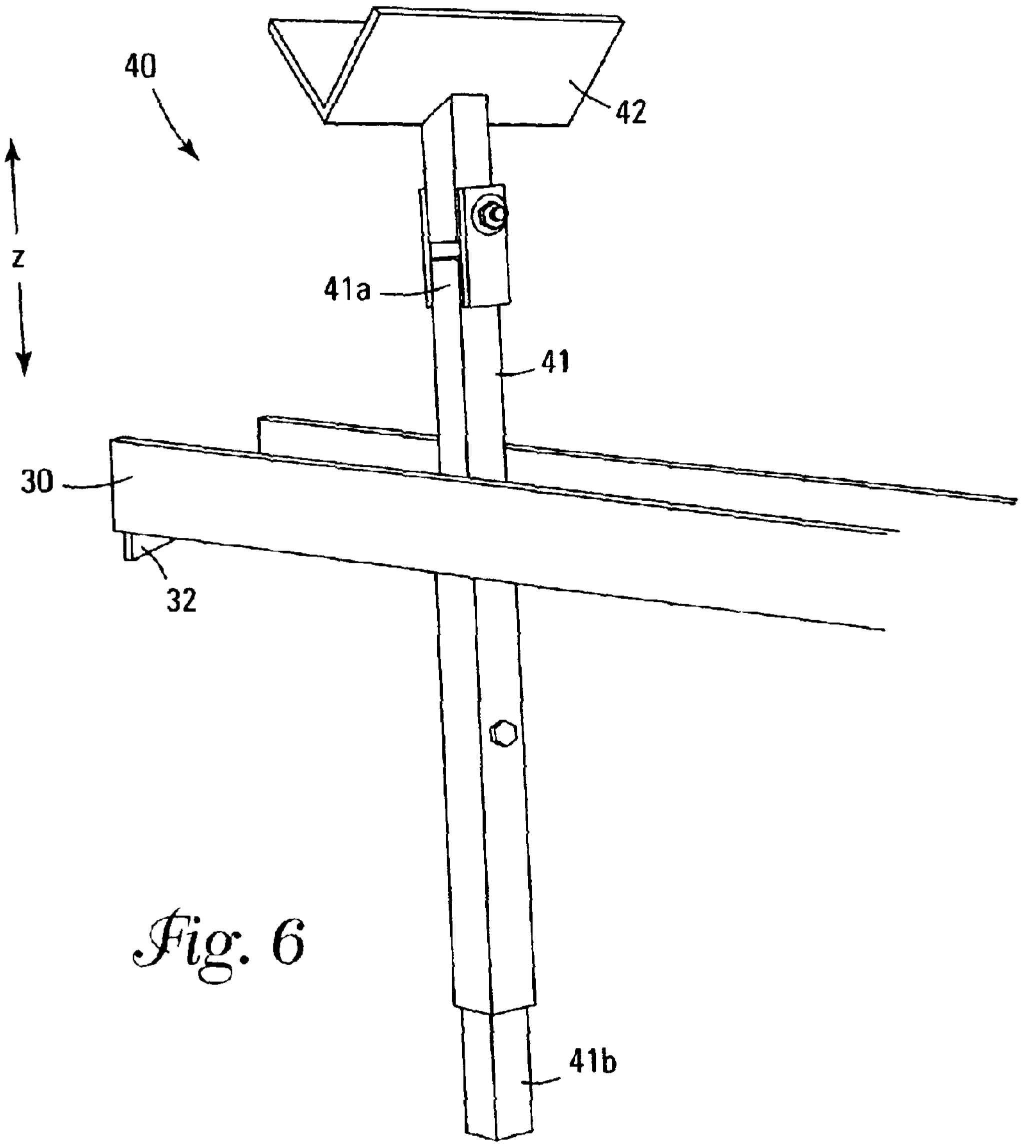
FIG. 6 is a perspective view of one embodiment of a pipe jig attached to a selected crossbar.
Figure 14:
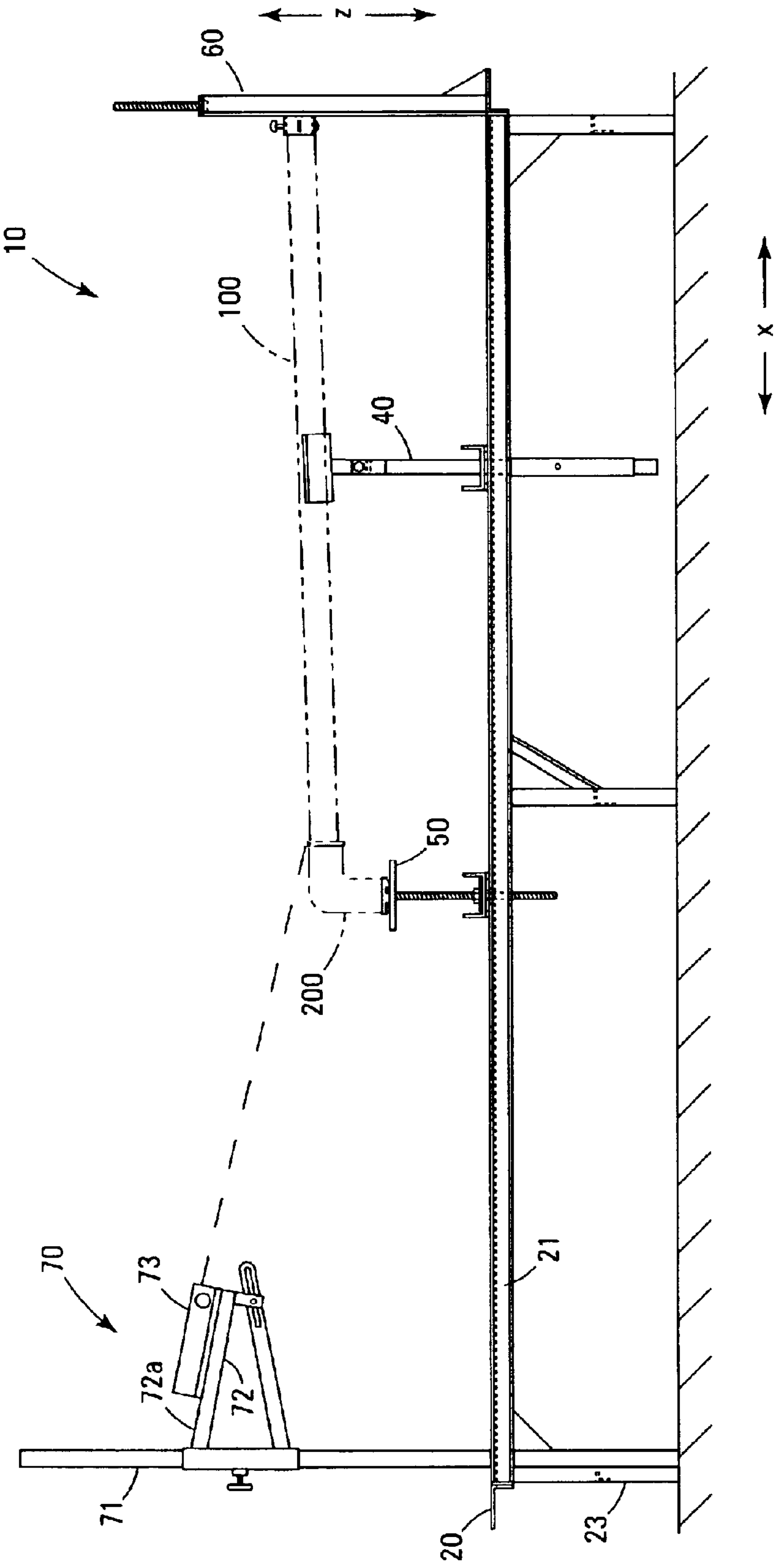
FIG. 14 is a side view of one embodiment of device with a laser level assembly.

As shown in FIG. 6 the at least one transversely z extending pipe jig 40 has a post 41 and a seat 42. The seat 42 is attached proximate the distal end 41*a* of the post 41. The pipe jig 40 is attached to a selected crossbar 30. As shown in FIG. 14, the pipe jig 40 is used to support the pipe 100 to be assembled on the device 10. The seat 42 is in contact with and supports the pipe 100.

The preferred embodiment of the pipe jig 40 is shown in FIG. 6. The seat 42 is pivotably attached to the distal end 41*a* of the post 41 to allow the transverse z angle of the pipe 100 to be adjusted to better simulate the site conditions where the pipe 100 will be finally installed. The pipe jig 40 is then repositionally attached to the selected crossbar 30 whereby the seat 42 may be transversely z repositioned relative to the selected crossbar 30.

Another embodiment of the pipe jig 40 has a seat 42 and a post 41. The seat 42 is attached proximate the distal end 41*a* of the post 41 and the seat 42 may be transversely z repositioned relative to the post 41 along the elongated length (not numbered) of the post 41. The seat 42 can be pivotable in the transverse z direction or not.

Another embodiment of the device 10 comprises a frame 20, a plurality of laterally y extending crossbars 30, and at least one transversely z extending fitting jig 50. The at least one transversely z extending fitting jig 50 has a post 51 and an interface member 52. The interface member 52 is attached to the post 51 proximate the distal end 51*a* of the post 51. The fitting jig 50 is repositionally attached to a selected crossbar 30 whereby the interface member 52 may be transversely z repositioned relative to the selected crossbar 30. Preferably the fitting jig's 50 post 51 is a threaded rod. The threaded post 51 may then be inserted into a threaded bore 33 through the crossbar 30. The post 51 may then be rotated about a transverse z axis 33*a* of the bore 33 thereby transversely z repositioning, relative to the selected crossbar 30, the interface member 52 attached proximate the distal end 51*a* of the post 51 of the fitting jig 50.

Figure 7:
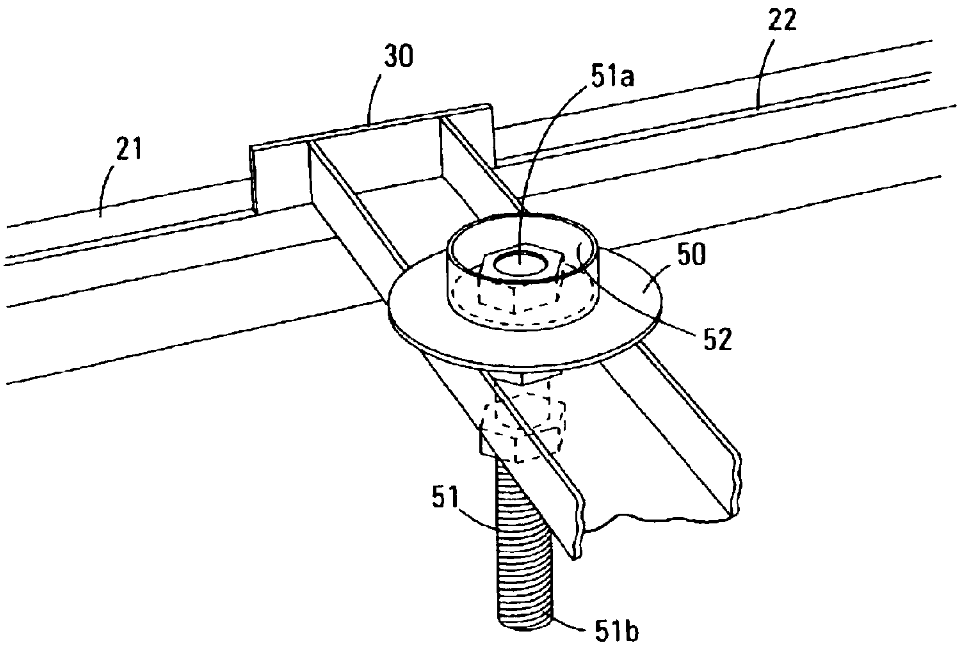
FIG. 7 is a partial perspective view of one embodiment of a crossbar attached to a rail of the frame and one embodiment of a fitting jig repositionally attached to the crossbar.
Figure 8:
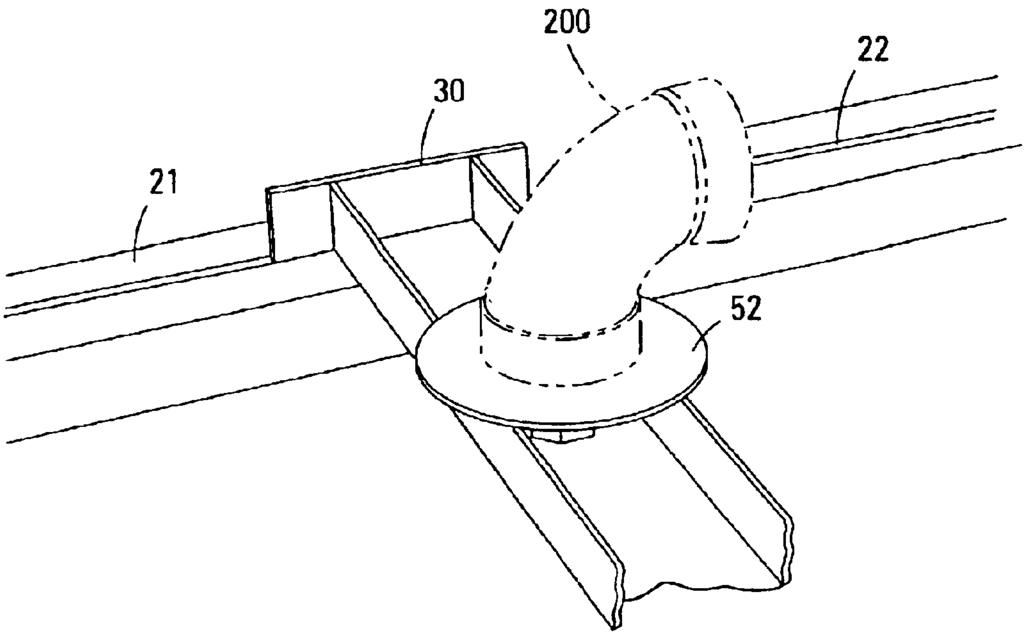
FIG. 8 is a perspective view of the fitting jig in FIG. 7 but with a pipefitting inserted on the fitting jig.
Figure 9:
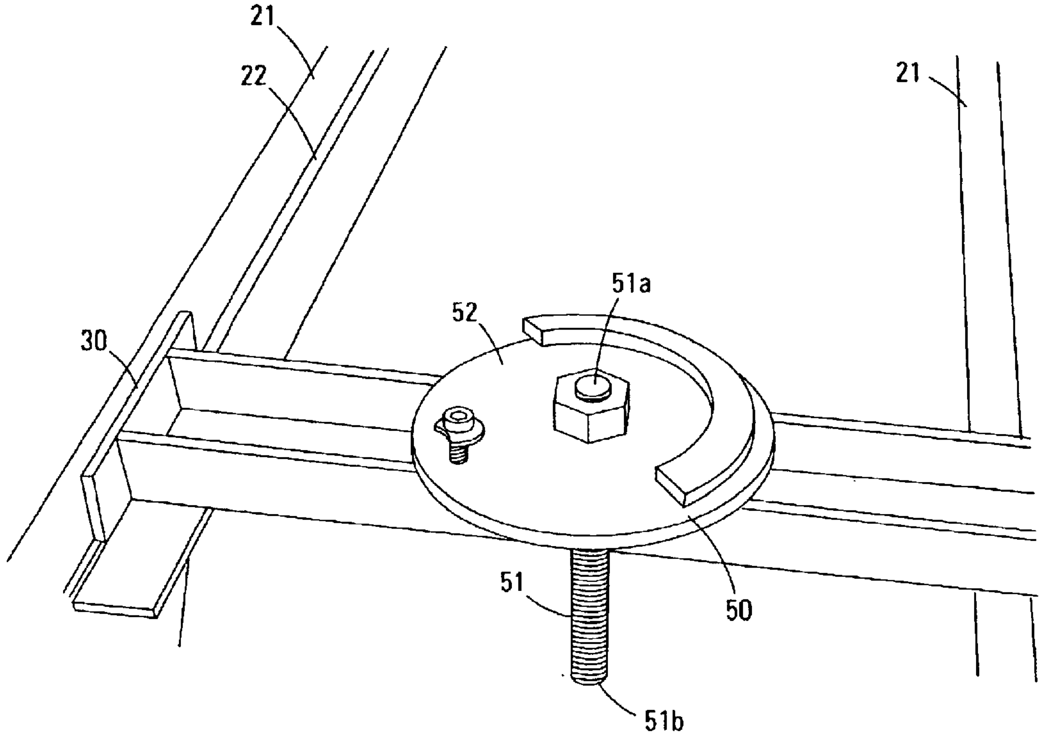
FIG. 9 is a perspective view of another embodiment of a fitting jig attached to a crossbar.
Figure 10:
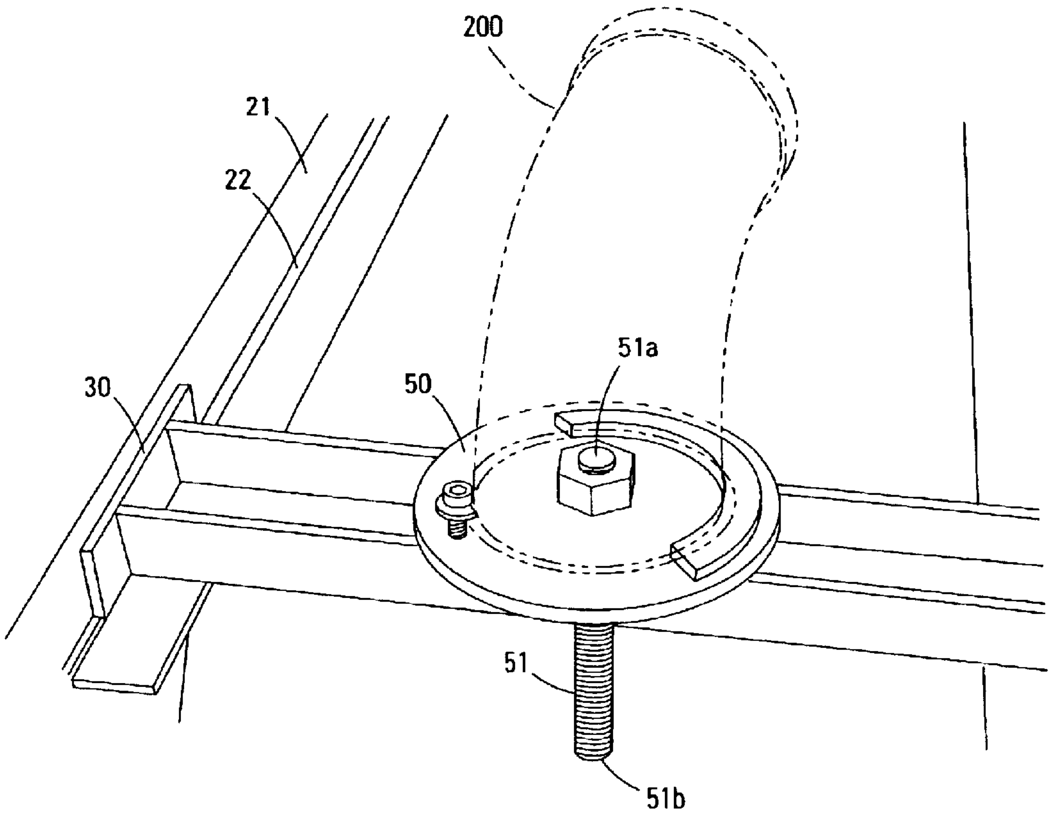
FIG. 10 is the fitting jig in FIG. 9 with a pipefitting inserted in the fitting jig.
Figure 11:
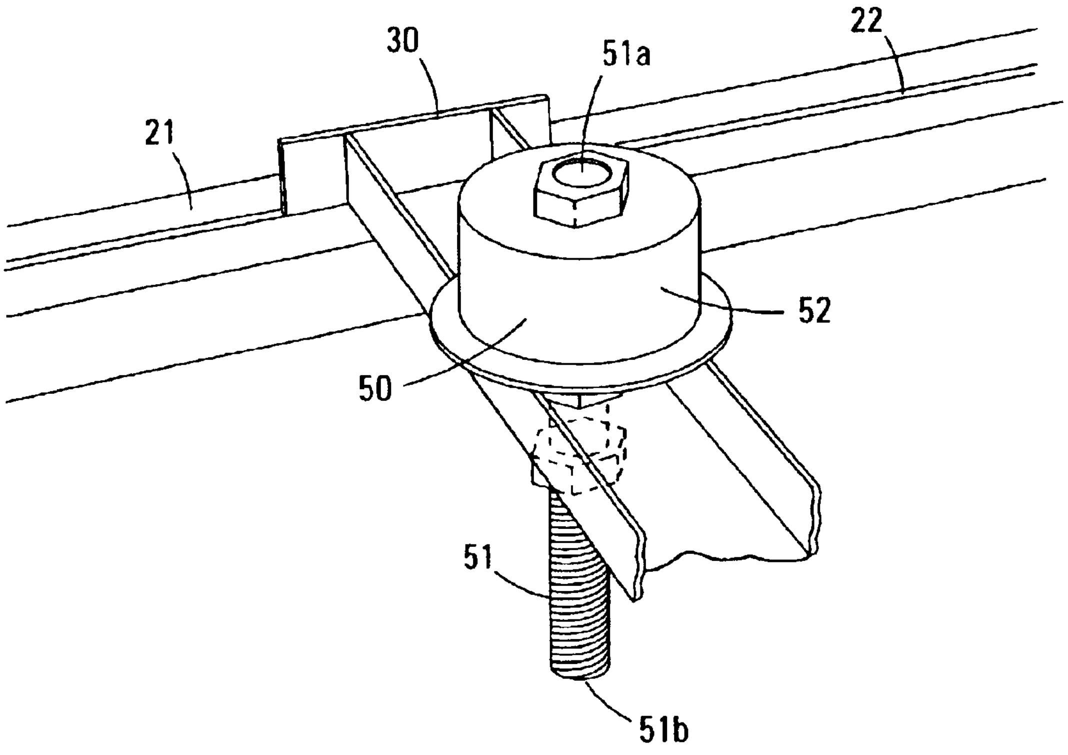
FIG. 11 is a perspective view of another embodiment of the fitting jig.

As shown in FIGS. 8 and 10, the interface member 52 is to interface with and support the pipefitting 200 that is to connect to the pipe 100. Preferably the interface member 52 removably attaches to the pipefitting 200 so as to hold the pipefitting 200 in place below the pipe 100. One embodiment of an interface member 52 is shown in FIGS. 7 and 8. This type of interface member 52 works preferably with polyvinyl chloride (PVC) pipefittings 200. Another embodiment of the interface member 52 is shown in FIG. 11. This type of interface member 52 works preferably with copper pipefittings 200. A third embodiment of the interface member 52 is shown in FIGS. 9 and 10. This type of interface member 52 works preferably with cast iron pipefittings 200.

Another embodiment of the device 10 comprises a frame 20, a plurality of laterally y extending crossbars 30, at least one transversely z extending pipe jig 40 attached to a selected crossbar 30, and at least one transversely z extending fitting jig 50 repositionally attached to another selected crossbar 30.

To increase the versatility of the device 10, another embodiment of the crossbar 30 comprises multiple bores 33 through one or more of the crossbars 30. The bores 33 can be used to allow not only transverse z repositioning of the pipe jigs 40 and/or the fitting jigs 50, but also lateral y repositioning of the pipe jigs 40 and/or fitting jigs 50. By providing a succession of crossbar 30 bores 33 the device 10 allows for different lateral y placement of the pipefitting 200 on the fitting jig 50 from the main pipe 100 depending on the distance the pipefitting 200 needs to be laterally y from the main pipe 100. For example, bathroom fixture pipefittings 200 are set a standard lateral y distance from the main waste pipe 100 in bathrooms. But the lateral y distance must be adjusted depending on the size of boards used to frame in the bathroom wall. When 2-inch×4-inch boards are used the center of the pipefitting 200 should be 15 inches from the center (not shown) of the waste pipe 100. The distance is increased to 16 inches when 2-inch×6-inch boards are used and 17 inches when 2-inch×8-inch boards are used. Therefore, a crossbar 30 with a bore 33 centered laterally y along the length 31 of the crossbar 30 (for a pipe jig 40) could have a set of three bores 33 at 15, 16, and 17 inches on center from the centered crossbar 30 bore 33 to allow the fitting jig 50 to be repositioned depending on the boards used for the walls in the particular construction job the pipe 100 assembly is being made.

Another option is to provide one or more laterally y extending slots 34 along the length 31 of the crossbar 30 as shown in FIG. 1. The slots 34 may allow the lateral y repositioning of a pipe jig 40 or a fitting jig 50. This not only allows for placement of laterally y placed fitting jigs 50 but allows for the addition of another section of pipe 100 that can run laterally y from the device 10.

Figure 5:
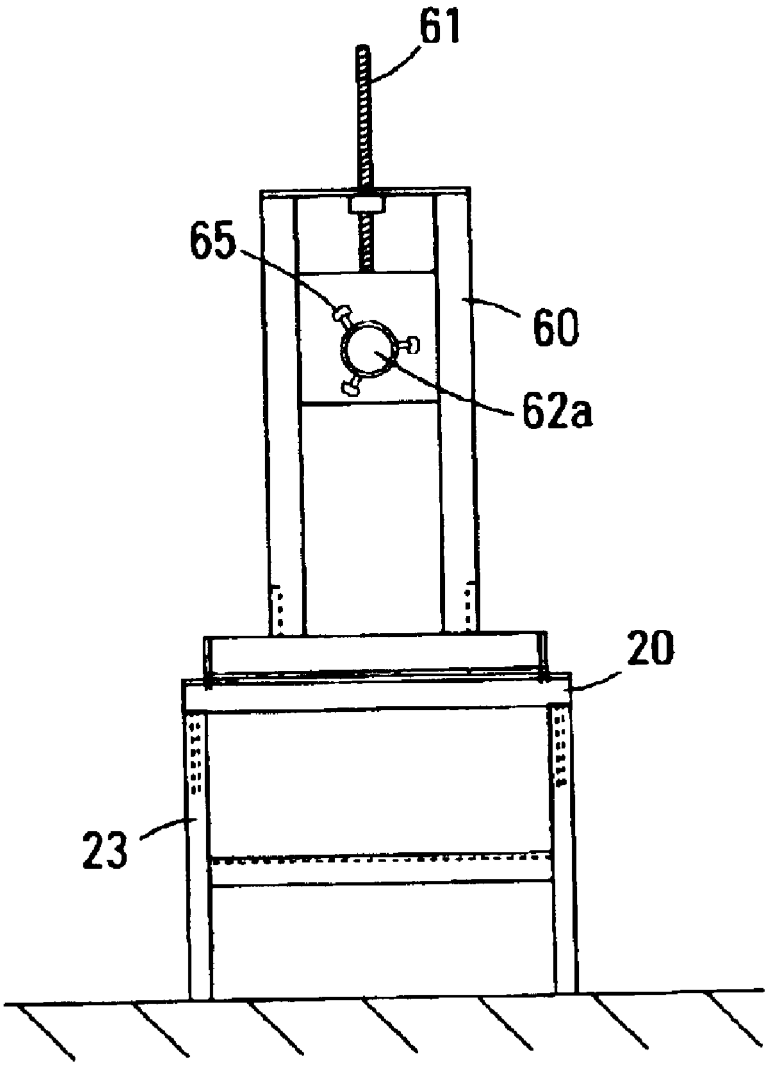
FIG. 5 is an end view of one embodiment of the frame with an end jig attached.
Figure 12:
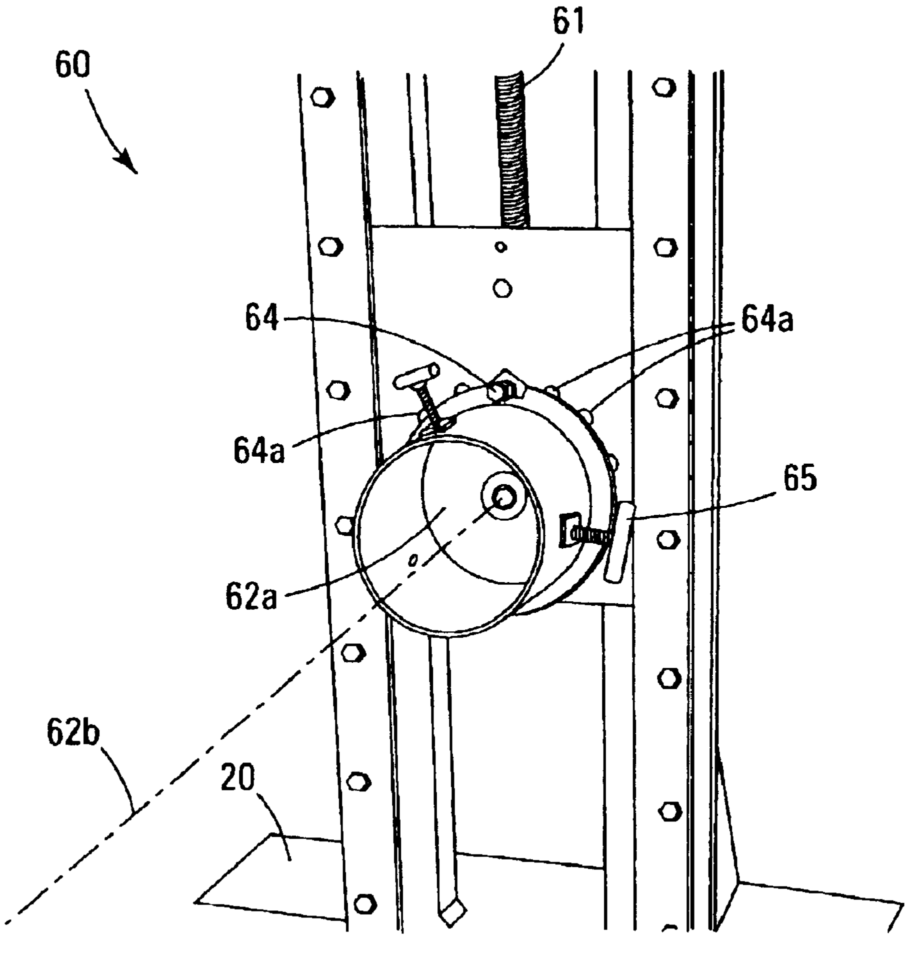
FIG. 12 is a perspective view of one embodiment of an end jig.
Figure 13:
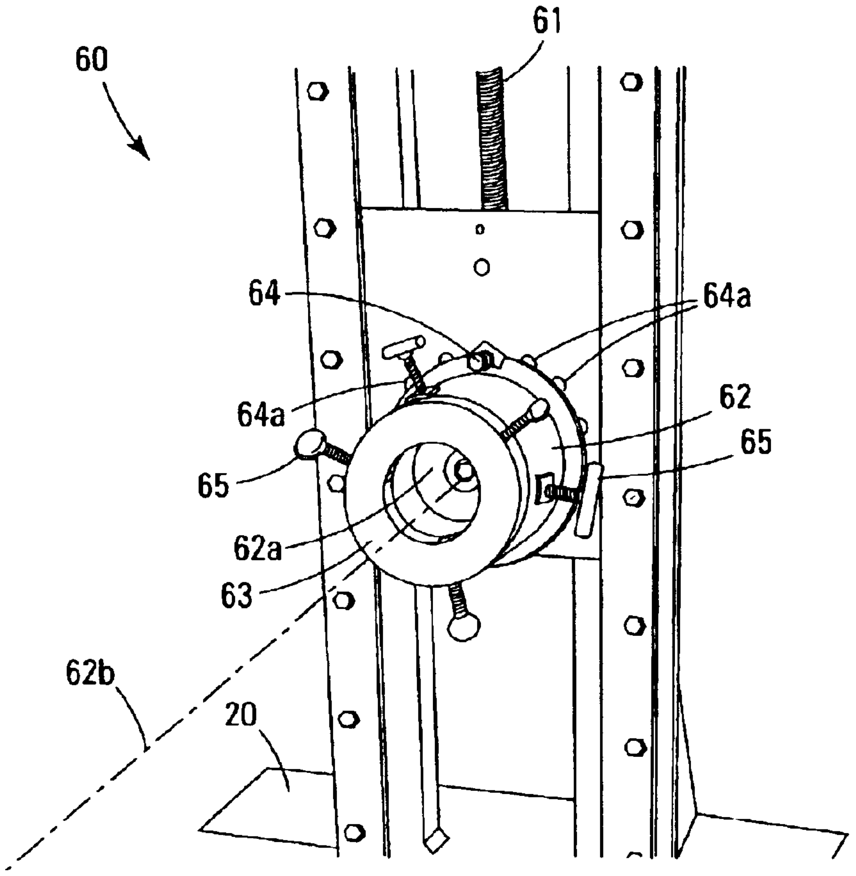
FIG. 13 is a perspective view of the end jig in FIG. 12 with a bushing inserted in the connection member of the end jig.

Optionally, any of the previously mentioned embodiments of the device 10 may also have a longitudinally x extending end jig 60 as shown in FIGS. 1, 2 and 5. The end jig 60 has a post 61 and a connection member 62. The end jig 60 can be repositionally attached to the frame 20 of the device 10 allowing the connection member 62 to be transversely z repositioned relative to the frame 20 or fixedly attached to the frame 20. The transverse z repositioning of the connection member 62 allows for adjustment of the pitch of the pipe 100 inserted within the connection member 62 along the longitudinal x length (not numbered) of the pipe 100. The connection member 62 may also be rotateable about a longitudinal x axis 62*b*. Preferably the connection member 62 may rotate up to 90° in either direction about the axis 62*b*. Preferably the connection member 62 holds angles of 0°, 22.5°, 45°, 60°, and 90° in either direction about the axis 62*b* with an angle adjuster 64 as shown in FIGS. 12 and 13. The angle adjuster 64 may allow the user to rotate the connection member 62 about the longitudinal x axis 62*b* of the connection member 62 to the desired angle and then secure the connection member 62 from further rotation. As shown in FIGS. 12 and 13 the preferred angle adjuster 64 comprises a pin (not numbered) that is attached to the connection member 62 and slides into and out of an angle adjuster 64 bore 64*a* in the connection member 62 at the angles of 0°, 22.5°, 45°, 60°, and 90° in either direction about the axis 62*b* of the connection member 62.

The connection member 62 of the end jig 60 may be made of any suitable material such as metal, wood or PVC. The preferred material is metal. The preferred configuration of the connection member 62 is a longitudinally x extending cylindrical member (not numbered) with a bore 62*a* within the center of the member (not numbered). This allows a pipe 100 end (not numbered) to be inserted into the bore 62*a* and anchored into place with tightening mechanisms 65. The tightening mechanisms 65 allow the pitch and/or angle of the pipe 100 to be changed without the pipe 100 becoming disengaged from the connection member 62. As shown in FIGS. 12 and 13 tightening mechanisms 65 may be used to secure the pipe 100 end (not numbered) into the connection member 62. To accommodate for different diameter pipe 100 a bushing 63 may be inserted into the connection member's 62 bore 62*a* to decrease the diameter (not numbered) of the bore 62*a* in the connection member 62.

As shown in FIG. 14, an additional option available for any of the embodiments of the device 10 is the laser level assembly 70. The laser level assembly 70 comprises a post 71, a longitudinally x extending platform 72, and a laser level 73. The post 71 may be either fixedly attached to the frame 20 or removably attached to the frame 20. Preferably the post 71 is attached to a longitudinal x end (not numbered) of the frame 20. The longitudinally x extending platform 72 may be repositionally attached to the post 71 wherein the platform 72 may be transversely z repositioned relative to the frame 20. The laser level 73 may then be removably attached to the platform 72. The distal end 72*a* of the platform 72 may also be pivotably connected to the post 71 of the laser level assembly 70. Pivotally connecting the distal end 72*a* of the platform 72 to the post 71 allows the platform 72 to be adjusted transversely z depending on the transverse z position of the pipefitting 200 or pipe 100 that needs aligned. A laser level 73 may then be set upon or attached to the platform 72. The laser level 73 used may be any laser level 73 acceptable in the construction field.

Use

The device 10 is used to assemble pipe 100 and pipefittings 200 into the required configuration for installation into a structure (not shown). In particular the device 10 allows large sections of pipe 100 and pipefittings 200 to be assembled at a location other than the construction site to insure proper assembly prior to installation into the structure (not shown). But, the device 10 may also be utilized on the construction site for assembly prior to installation in the structure (not shown). Due to the configuration of the device 10 the pipe 100 and pipefittings 200 are assembled in an inverted position in relation to how the assembled pipe 100 and pipefittings 200 will be installed in the structure (not shown).

The preferred method of use of the device 10 includes using a frame 20 having at least two longitudinally x elongated rails 21 laterally y spaced from one another 21. See FIG. 1. Therefore, the remainder of the discussion will be based on a device 10 utilizing two longitudinally x elongated rails 21 laterally y spaced from one another 21.

A frame 20 having at least four transversely z adjustable legs 23 is also preferred as it provides stability to the frame 20. The adjustable legs 23 also allow the transverse z height (not numbered) of the frame 20 to be adjusted to a comfortable height for the user (not shown) of the device 10 or to accommodate for a non-level surface (not shown) upon which the device 10 may rest.

A laterally y extending crossbar 30 is then repositionally attached to the rails 21. The crossbar 30 may be placed on the top surface (not numbered) of the rails 21 and anchored to the rails 21 with clamps, such as C-clamps, bar clamps, or springs clamps. Preferably a crossbar 30 has runners 32 on its lateral y ends (not numbered) as shown in FIG. 6. The runners 32 may then be inserted into the tracks 22 of the rails 21. This allows the longitudinal x repositioning of the crossbar 30 along the length 21*a* of the rail 21. Preferably the crossbar 30 also has a square bore 33 in the lateral y center of the crossbar 30 with a transversely z extending hollow square sleeve protruding from the underside (not numbered) of the crossbar 30 from the bore 33. A transversely z extending pipe jig 40 is then attached to the crossbar 30 through the bore 33. As shown in FIG. 6, the pipe jig 40 may have a post 41 made of a length of square tubing wherein the square tubing's diameter (not numbered) is slightly smaller than the diameter (not numbered) of the square bore 33 in the selected crossbar 30. The proximal end 41*b* of the post 41 may then be inserted through the bore 33 into the square sleeve (not numbered). A securing mechanism (not numbered), such as a screw and bolt or a thumb screw, may be used to anchor the post 41 of the pipe jig 40 at the desired transverse z height (not numbered) relative to the frame 20.

The seat 42 of the pipe jig 40 is attached to the distal end 41*a* of the post 41. Preferably the seat 42 is pivotably attached to the distal end 41*a* of the post 41 as shown in FIG. 6. This allows the pitch of the pipe 100 to be adjusted. The configuration of the seat 42 may be any configuration that limits lateral y and longitudinal x movement of the pipe 100 inserted in the seat 42. The configuration illustrated in FIG. 6 is the preferred configuration. For additional stability of the pipe 100, a binding mechanism such as wire or chain may be utilized to secure the pipe 100 to the pipe jig 40.

The longitudinal x position of the crossbar 30 with the pipe jig 40 inserted can be repositioned along the longitudinal x length 21*a* of the rails 21. Usually the first crossbar 30 with a pipe jig 40 is positioned proximate one end (not numbered) of the frame 20. See FIG. 14. Once the longitudinal x position of the crossbar 30 is decided, the crossbar 30 may be secured to the rails 21 to prevent further repositioning. Preferably clamps (not shown), such as C-clamps, bar clamps, or spring clamps, are utilized. This allows the crossbar 30 to be repositioned later if needed.

A pipefitting 200 is usually attached to one end (not numbered) of the pipe 100. To facilitate proper alignment of the pipefitting 200 another crossbar 30 is then repositionally attached to the rails 21. This crossbar 30 is preferably positioned longitudinally x along the length 21*a* of the rails 21 so as to be proximate the end (not numbered) of the pipe 100 where the pipefitting 200 will be attached. The type of crossbar 30 used for the pipefitting 200 depends on the type of pipefitting 200 needing to be attached. If the pipefitting 200 extends in the transverse z direction only (relative to the frame 20) then a crossbar 30 having a bore 33 for insertion of a fitting jig 50 will be proximate the same position as the bore 33 in the crossbar 30 with the pipe jig 40. If the pipefitting 200 extends in the lateral y direction (relative to the frame 20) then a crossbar 30 having one or more bores 33 positioned a lateral y distance from the center (not numbered) of the crossbar 30 will be needed. See FIG. 4. A crossbar 30 having slots 34 may also be utilized for repositioning of the fitting jig 50 laterally y along the length 31 of the crossbar 30. See FIG. 1.

The proximal end 51*b* of the post 51 of the fitting jig 50 may then be inserted into the selected crossbar 30. The fitting jig 50 has an interface member 52 attached proximate the distal end 51*a* of the post 51. The interface member 52 configuration may depend on the type of pipe 100 and pipefitting 200 being assembled. The interface member 52 should be configured and arranged to securely hold an end (not numbered) of the pipefitting 200 to provide support and stability for proper alignment with the pipe 100. For PVC or copper pipes 100 and pipefittings 200 an interface member 52 such as that shown in FIGS. 7 and 11 may be utilized. The interface members 52 in FIGS. 7 and 11 provide a base (not numbered) for the pipefitting 200 to rest upon and a circular disk of metal (not numbered) that slidably fits within the end (not numbered) of the pipefitting 200 to secure the pipefitting 200 to the fitting jig 50. As shown in FIG. 9, another embodiment of the interface member 52 may be utilized for cast iron pipe 100 and pipefittings 200. As shown in FIG. 10 this interface member 52 also has a base (not numbered) for the pipefitting 200 to rest upon. To secure the pipefitting to the fitting jig 50, a half-moon shaped lip (not numbered) of metal is attached to less than the entire outer edge of the base (not numbered) to allow the lip (not numbered) of the cast iron pipefitting 200 to slide between the moon shaped lip (not numbered) and the base (not numbered) of the interface member 52. A locking mechanism (not numbered) is then tightened over the lip (not numbered) of the cast iron pipefitting 200 opposite the half-moon lip (not numbered) to secure the pipefitting 200 to the interface member 52.

The pipefitting 200 is then secured to the fitting jig 50. The fitting jig 50, with the pipefitting 200, may then be laterally y positioned along the crossbar 30 if the post 51 was inserted in a slot 34 as opposed to a bore 33. The interface member 52 may then be transversely z repositioned relative to the crossbar 30 in order to allow the pipefitting 200 to properly connect with the end (not numbered) of the pipe 100. Preferably the post 51 of the fitting jig 50 is a threaded rod. The interface member 52 is then attached to the post 51 by insertion of the distal end 51*a* of the post 51 into a threaded bore (not numbered) in the interface member 52. Using the threaded rod (not numbered) for a post 51 then allows the interface member 52 to be transversely z repositioned by repositioning the post 51 in relation to the crossbar 30, which in turn repositions the interface member 52. The interface member 52 may be repositioned along the transverse z length (not numbered) of the post 51. Either method transversely z repositions the interface member 52 relative to the crossbar 30.

Often multiple pipefittings 200 and pipes 100 are to be assembled into one unit and the pipefittings 200 are needed to extend from the pipe 100 in different directions. To accommodate this requirement, an end jig 60 may be used. This is more often needed for PVC or copper pipe 100.

The end jig 60 may be fixedly attached or removably attached to the frame 20. If an end jig 60 is not already attached to the frame 20 of the device 10, then an end jig 60 may be attached, typically, at one end (not numbered) of the frame 20. As shown in FIGS. 1, 2, and 14, the connection member 62 of the end jig 60 should be facing toward the other longitudinal x end (not numbered) of the frame 20. The end jig 60 utilized should have a connection member 62 sized to hold the pipe 100 that will be inserted. The connection member 62 may have a tightening mechanism 65 such as thumbscrews, to help secure the pipe 100 to the end jig 60. After a pipefitting 200 is attached to the other end (not numbered) of the pipe 100 using the method described above, the pipefitting 200 may be disengaged from the fitting jig 50 where it was secured. This would then allow the connection member 62 of the end jig 60 to be rotated about the axis 62*b* of the connection member 62 to a specified angle using the angle adjuster 64 on the end jig 60. To secure the angle, the connection member 62 may have a securing mechanism (not numbered) to prohibit movement of the connection member 62 once it is in the desired position. See FIGS. 12 and 13. Another pipefitting 200 may then be attached to the end (not numbered) of the assembled pipe 100 as previously set out but in a different plane (not shown) than the other pipefitting 200.

The end jig 60 may also be used to vary the transverse z height (not numbered) of the end (not numbered) of the pipe 100 in the end jig 60 relative to the frame 20 to change the pitch of the pipe 100 over a longitudinal x distance. One embodiment of the end jig 60, to facilitate the transverse z repositioning of the end jig 60, may be to have the post 61 be a rod. The post 61 may then be inserted into a bore (not shown) in the frame 20 and a securing mechanism (not numbered) such as a thumb screw, used to secure the end jig 60 at the desired transverse z distance from the frame 20.

As shown in FIG. 14, a laser level assembly 70 may also be used with the device 10. The laser level assembly 70 may be fixedly attached to the frame 20 of the device 10 or removably attached. In either case, the post 71 of the laser level assembly 70 is preferably attached proximate a longitudinal x end (not numbered) of the frame 20. The post 71 can be of any construction as long as it allows the longitudinally x extending platform 72 to be repositionally attached to the post 71. The preferred construction of the post 71 is a length of square metal tubing (not numbered). The post 71 is attached to the frame 20 such that the length (not numbered) of the post 71 is in the transverse z direction. The platform 72 is repositionally (relative to the frame 20) attached to the post 71. A preferred method of attachment is to have a transversely z extending hollow square metal tube (not numbered) affixed to the longitudinally x extending platform 72. The post 71 is then inserted through the hollow tube (not numbered) as shown in FIG. 14. The hollow tube (not numbered) then may slide transversely z along the length (not numbered) of the post 71. A securing mechanism (not numbered) may then be used to secure the platform 72 at the desired transverse z distance from the frame 20.

A laser level 73 may then be set upon or attached to the platform 72. The level 73 may then be used to determine whether the pipe 100 or pipefitting 200 is level or properly aligned as is required by the design of the structure (not shown) where the pipe 100 assembly will be installed. The distal end 72*a* of the platform 72 may also be pivotably connected to the post 71. This allows the laser level 73 to be angled transversely z to adjust the transverse z height of a pipefitting 200 or pipe 100.

Once the pipe 100 and pipefittings 200 for a particular section of a structure (not shown) are assembled on the device 10 into a unit (not numbered), the unit (not numbered) may be removed from the device 10. The unit (not numbered) may then be transported to the construction site intact and installed into the appropriate area of the structure (not shown). This allows for less time on the construction site by the pipe 100 assemblers and less need for storage of plumbing materials and equipment at the construction site.

I claim:

1. A device to facilitate assembly of plumbing pipes and fittings, comprising:

(a) a frame having at least a longitudinally elongated rail;

(b) a plurality of laterally extending crossbars repositionally attached to the rail whereby the plurality of crossbars may be longitudinally repositioned along the rail; and (c) at least one transversely extending pipe jig having a post and a seat attached proximate a distal end of the post wherein the pipe jig is attached to a selected crossbar; and (d) wherein the seat is pivotably attached proximate a distal end of the post.

2. The device as recited in claim 1, wherein the pipe jig is repositionally attached to the selected crossbar whereby the seat may be transversely repositioned relative to the selected crossbar.

3. The device as recited in claim 1, further comprising (d) at least one transversely extending fitting jig having a post and an interface member attached proximate a distal end of the post wherein the fitting jig is repositionally attached to an another selected crossbar whereby the interface member may be transversely repositioned relative to the selected crossbar.

4. The device as recited in claim 3, further comprising a laser level assembly having (i) a post attached to the frame, (ii) a longitudinally extending platform repositionally attached to the post wherein the platform may be transversely repositioned relative to the frame, and (iii) a laser level removably attached to the platform.

5. The device as recited in claim 1, wherein the frame has an another longitudinally elongated rail laterally spaced from the longitudinally elongated rail.

6. The device as recited in claim 1, wherein the transversely extending pipe jig is repositionally attached to the selected crossbar whereby the pipe jig may be repositioned along an elongated length of the selected crossbar.

7. The device as recited in claim 1, further comprising a longitudinally extending end jig having a post and a connection member attached to the post wherein (i) the end jig is attached to the frame whereby the connection member may be transversely repositioned relative to the frame, and (ii) the connection member is rotateable about an axis.

8. The device as recited in claim 1, further comprising a longitudinally extending end jig having a post and a connection member attached to the post wherein (i) the end jig is fixedly attached to the frame, and (ii) the connection member is rotateable about an axis.

9. A device to facilitate assembly of plumbing pipes and fittings, comprising:

(a) a frame having at least a longitudinally elongated rail;

(b) a plurality of laterally extending crossbars repositionally attached to the rail whereby the plurality of crossbars may be longitudinally repositioned along the rail; and (c) at least one transversely extending fitting jig having a post and an interface member attached proximate a distal end of the post wherein the fitting jig is repositionally attached to a selected crossbar whereby the interface member may be transversely repositioned relative to the selected crossbar; and (d) wherein the transversely extending fitting jig is also repositionally attached to the selected crossbar whereby the fitting jig may be repositioned along an elongated length of the selected crossbar.

10. The device as recited in claim 9, wherein the frame has an another longitudinally elongated rail laterally spaced from the longitudinally elongated rail.

11. The device as recited in claim 9, further comprising a longitudinally extending end jig having a post and an connection member attached to the post wherein (i) the end jig is repositionally attached to the frame whereby the connection member may be transversely repositioned relative to the frame, and (ii) the connection member is rotateable about an axis.

12. The device as recited in claim 9, further comprising a laser level assembly having (i) a post attached to the frame, (ii) a longitudinally extending platform repositionally attached to the post wherein the platform may be transversely repositioned relative to the frame, and (iii) a laser level removably attached to the platform.

13. The device as recited in claim 12, wherein a distal end of the platform is pivotably connected to the post of the laser level assembly.

14. A device to facilitate assembly of plumbing pipes and fittings, comprising:

(a) a frame having at least a longitudinally elongated rail;

(b) a plurality of laterally extending crossbars repositionally attached to the rail whereby the plurality of crossbars may be longitudinally repositioned along the rail; and (c) at least one transversely extending pipe jig having a post and a pivotable seat repositionally attached proximate a distal end of the post wherein (i) the pipe jig is attached to a selected crossbar, and (ii) the pivotable seat may be transversely repositioned relative to the post along an elongated length of the post.

15. The device as recited in claim 14, further comprising (d) at least one transversely extending fitting jig having a post and an interface member attached proximate a distal end of the post wherein the fitting jig is repositionally attached to an another selected crossbar whereby the interface member may be transversely repositioned relative to the selected crossbar.

16. The device as recited in claim 14, wherein the frame has an another longitudinally elongated rail laterally spaced from the longitudinally elongated rail.

17. The device as recited in claim 14, wherein the transversely extending pipe jig is also repositionally attached to the selected crossbar whereby the pipe jig may be repositioned along an elongated length of the selected crossbar.

18. The device as recited in claim 14, further comprising a longitudinally extending end jig having a post and a connection member attached to the post wherein (i) the end jig is attached to the frame whereby the connection member may be transversely repositioned relative to the frame, and (ii) the connection member is rotateable about an axis.

* * * * *